May 7, 1963 — T. L. SMITH — 3,088,185
OPPOSED BOLT CLAMP
Filed May 26, 1960 — 3 Sheets-Sheet 1

INVENTOR.
TELFORD L. SMITH
BY
ATTORNEY

May 7, 1963
T. L. SMITH
3,088,185
OPPOSED BOLT CLAMP
Filed May 26, 1960
3 Sheets-Sheet 2
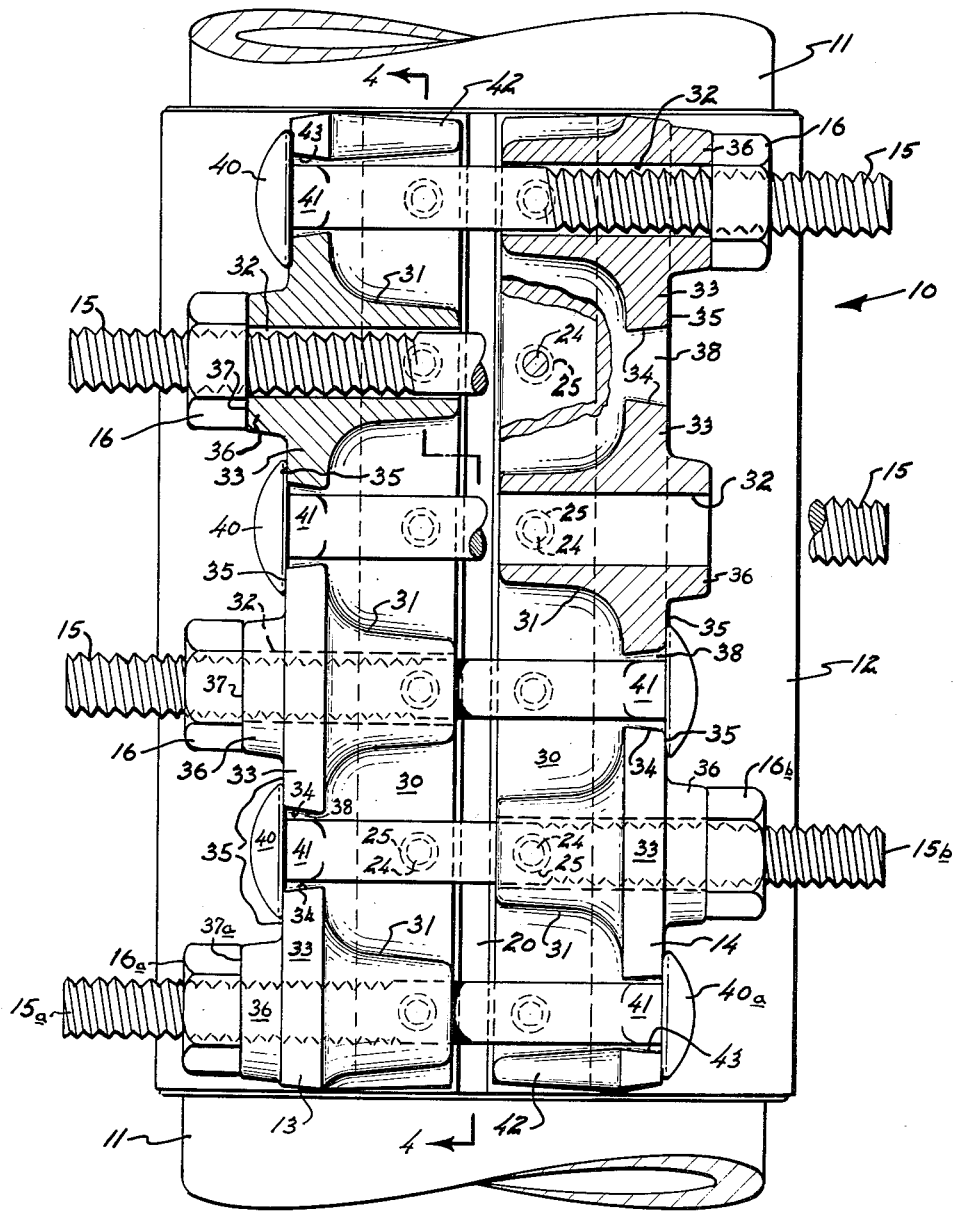
FIG. 3
INVENTOR.
TELFORD L. SMITH
BY
ATTORNEY

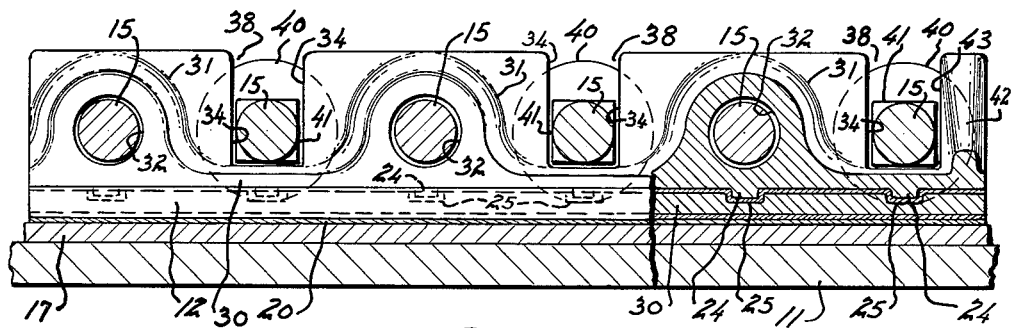
Fig. 4
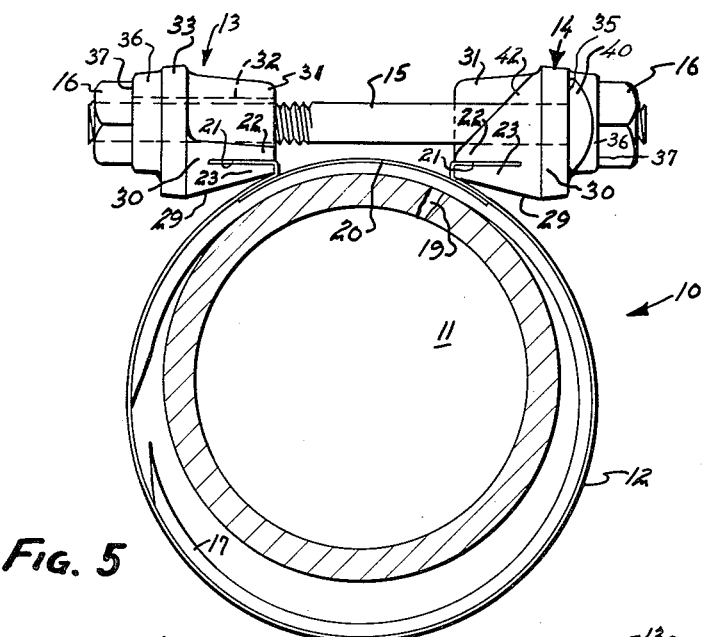
Fig. 5
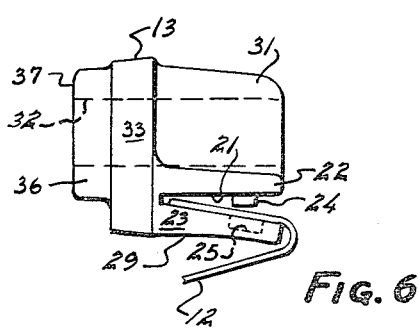
Fig. 6
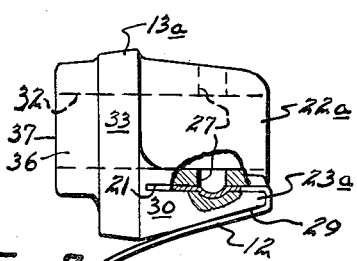
Fig. 7
INVENTOR.
TELFORD L. SMITH
BY
ATTORNEY

| United States Patent Office | 3,088,185
Patented May 7, 1963 |
|---|---|

3,088,185
OPPOSED BOLT CLAMP
Telford L. Smith, Los Altos, Calif.
(1292 Toyon Drive, Millbrae, Calif.)
Filed May 26, 1960, Ser. No. 32,025
6 Claims. (Cl. 24—279)

This invention relates to an improved pipe clamp for repairing leaks in cylindrical conduits of the type characterized by rigid lugs secured to a malleable band which goes around the conduit. More particularly, it relates to an improved lug structure and bolt combination for such a clamp.

Pipe clamps comprising an encircling malleable band secured to a set of lugs are well known in the art. However, problems have long been associated with such clamps due to the stress effects produced when the force is applied to draw the lugs together to tighten the band around the pipe. For one thing, the lugs have an inherent tendency to tilt and exert concentrated pressure at certain points on the pipe surface. This often has resulted in a gouging action by the lugs or a crushing of the pipe wall. Another harmful effect of the tightening force was a resultant bending stress exerted by the tilting lugs on the bolts connecting the lug members.

In the prior art, certain clamp configurations were developed which, to a degree, solved these basic stress problems. However, these clamps in their various forms relied on relatively complicated lug structures which included integral supporting guide fingers, close-tolerance bolt-holes or retaining protuberances, and in some cases extended contacting surfaces which provided a lever fulcrum between the mating lugs. The resulting complicated clamp structures not only were expensive to manufacture but also were subject to damage due to the rough handling so often encountered in pipe repair work.

The guide fingers found on some prior-art lug structures provided perhaps the greatest measure of success in overcoming the stress problems in the clamps. However, in the present invention I have eliminated the guide fingers entirely and yet, by means of a unique lug-and-bolt combination I have achieved an even greater stress-reducing effect. My clamp comprises two novel lug members of identical shape which, when attached to the malleable band and placed facing each other, provide complementing holes and slots to retain the tightening bolts. The adjacent bolts face in opposite directions across the lugs so that each bolt enters a bolt-hole in one lug and is retained by a slot in the opposite lug. I discovered that this novel arrangement, together with my unique lug-configuration, serves to distribute the resultant forces on the lugs so that the tilting of the lugs and the bending stress on the bolts is effectively eliminated. Moreover, since each bolt is retained at one end only by a slot, a vertical degree of freedom is afforded to each bolt, and this allows it to align itself automatically into the optimum axial position as the lugs are drawn together, which further helps to minimize the bending stress.

It is an object of the present invention, therefore, to provide an improved clamp which overcomes the aforementioned stress problems imposed by tightening forces, and yet is simple in shape, so that close tolerances are not required and the clamp can be manufactured with a minimum of production steps.

Another object of the invention is to provide a clamp which will seal leaks in pipes under extremely high pressure.

Another object of the invention is to provide a simplified lug-configuration which is so formed that two identical lugs can be utilized interchangeably in the same clamp.

Still another object is to provide an extremely rugged clamp which can withstand long and hard usage as well as high clamping forces.

More specifically, an object of my invention is to provide a simplified clamp-configuration wherein the bolts serve to stabilize the lugs and counteract their tilting tendency during the tightening process, thus eliminating the need for auxiliary guide-fingers. My novel combination of lugs and bolts essentially provides a symmetrical loading on the lugs which eliminates both the tendency of the lugs to tilt and the resulting concentration of lug pressure on the pipe.

Another object of my invention is to provide a clamp which is easy to assemble around the pipe. With my novel clamp, each bolt must be guided through only one hole, having a large clearance in one lug, and this step can be accomplished before the band is passed around the pipe. It is an easy matter to then place the bolt-head in an aligned slot in the opposite lug, before the tightening is commenced. This is an important feature of my invention, especially where the clamp must be attached in a confined location where visibility and working-room are limited, as often is the case in pipe repair work.

This combination of all the forementioned results is very important, and has been achieved by a novel structure of the article, as will be set forth in the specification. Other objects and advantages of the invention also will appear from the following description.

In the drawings:

FIG. 3 is a plan view of the clamp taken along the line 3—3 in FIG. 2, with parts broken away and shown in section.

FIG. 4 is a view in side elevation and in section of the clamp taken along the line 4—4 of FIG. 3.

FIG. 5 is a view in end elevation of the clamp shown in FIG. 1, intermediate in scale between FIGS. 1 and 2, showing the clamp before the malleable band is tightened around the pipe.

FIG. 6 is a fragmentary view in end elevation of a single lug, showing the end of the malleable clamping-band being inserted between the opened jaws on the lug.

FIG. 7 is a view like FIG. 6, of a modified form of lug attached to the malleable band in a different way; using the access-hole through the upper jaw.

Figures 1, 2:
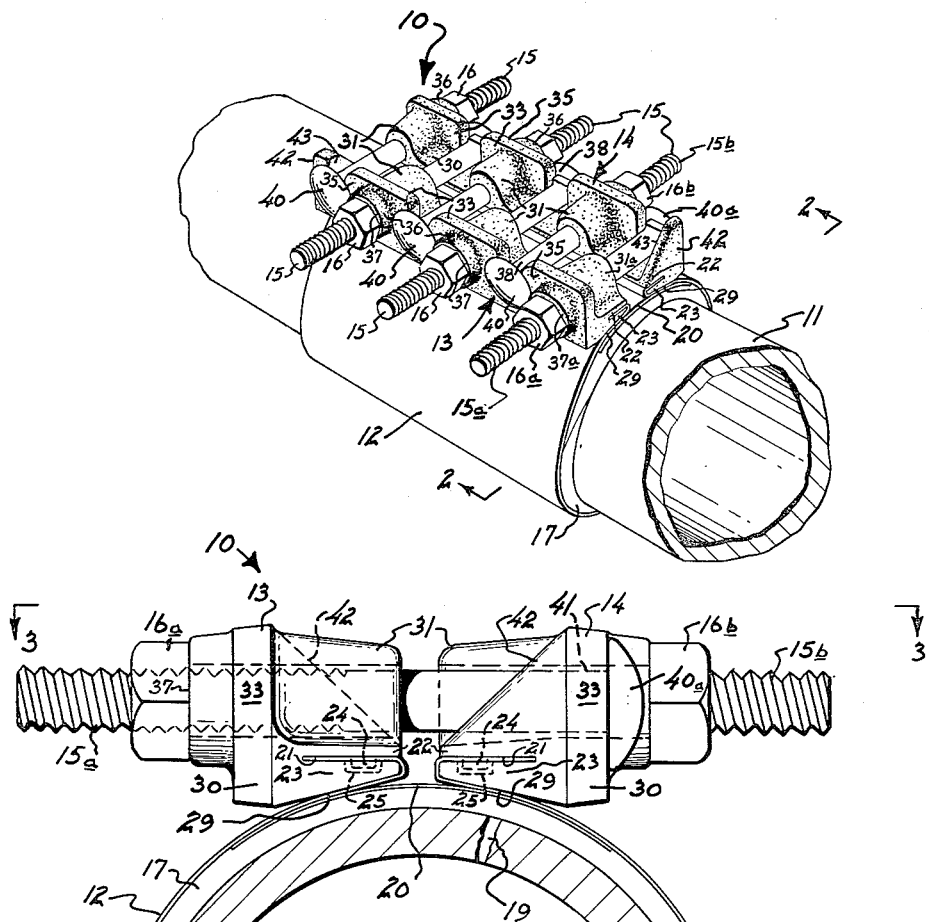
FIG. 1 is a view in perspective, showing a clamp embodying the principles of the invention, in its closed position around a section of pipe.
FIG. 2 is an enlarged view in end elevation of the clamp taken along the plane 2—2 in FIG. 1.

In broad terms, my invention pertains to a new clamp structure for repairing leaks in pipes and is designated generally by the numeral 10 throughout the drawings. In FIG. 1, the clamp 10 is shown in the tightened position around a pipe 11 and comprises a circular malleable band 12 having lugs 13 and 14 attached to each of its ends. The lugs 13 and 14 which embody the principles of the present invention are identical in size and shape and are tightened together by bolts 15 and nuts 16. As shown, bolts 15 are attached to the lug members in an alternate end-to-end arrangement along the clamp 10, and pull the one-piece band 12 tight around a gasket 17 are directly around the pipe 11, if and when that is desired. Preferably, a gasket 17 is used, and preferably it is provided with an armouring-strip 20 adjacent the bite of the lugs 13 and 14. The numeral 19 in FIG. 2 indicates a hole or crack in the pipe 11 which the gasket 17 will seal. The higher the pressure of the fluid or gaseous medium in the pipe, the more difficult it becomes to effect a leak-proof repair.

Each end of the malleable clamping-band 12 is held firmly by one of the lugs 13 and 14, which preferably are made from a ductile metal such as bronze or malleable iron. Various means of holding the band 12 may be employed, one of which is shown in FIGS. 2 and 6, wherein the end of the band 12 is secured by a pair of closed jaws 22 and 23 of each lug. With this method, the band 12 is installed with the jaws 22 and 23 open as shown in FIG. 6, one jaw 22 being provided with projections or studs 24 that lie opposite mating holes, recesses or depressions 25 in the other jaw 23.

In the illustrated embodiment, the projections 24 extend outwardly from the radially outer jaw 22 and the holes 25 are in the radially inner jaw 23, but these elements can be reversed. The ends of the band 12 may be punched to provide holes to receive the projections 24, but preferably the bands 12 are not perforated, and the closing together of the jaws 22 and 23 upsets portions of the band 12 into the holes 26, eliminating the punching operation and giving even better holding power. Preferably, the jaws 22 and 23 are closed together in the factory so as to lock the band 12 in place. This eliminates the need for other securing means to grip the band in the lugs 13, 14.

In an alternate structure for attaching the band 12 to the lugs 13, 14, shown in FIG. 7, I omit the projections 25 and recesses 26 and use, instead, an access-hole 27 drilled vertically through the lug and the upper jaw 22a, as shown on the lug 13a. With the band 12 in position within the slot 21, a punch may then be inserted within the access-hole 27 and used to form a retaining dimple 28 on the band 12, which indents and thus seats in the lower jaw 23a.

As mentioned previously, the lugs 13, 14 are identical in size and shape, so that the lugs for clamps of the same size always are interchangeable. The lower base portion 30 of each lug is provided with the aforementioned jaw member 22 and 23 and when they are closed to lock the clamping band 12 the lower jaw 23 is wedge-shaped, so that its lower surface 29 will conform fairly closely with the curvature of the clamping-band 12 around the pipe 11 and thus distribute the force of each lug on the maximum area of pipe-surface contacted thereby.

On each lug member 13, 14 extending above the lower base portion 30 is a series of integrally attached projecting members 31, each of which provides a means for holding a bolt 15 in position. Each lug projection 31 has a generally curved or barrel-shaped exterior extending across the width of said lower base portion 30 and a central bore 32 whose axis lies in a plane substantially perpendicular to the pipe axis. The diameter of the bore 32 extending through each projection 30 is sufficient to receive a bolt 15 with a loose fit.

Extending outwardly from each projection 31 is an integral flange portion 33 which may be generally rectangular in shape. The flange 33 has a flat outer-edge surface 34 defining the flange thickness, which should be adequate to assure strength and rigidity on either side of the projection 31, and each flange 33 lies in a plane substantially perpendicular to the axis of the bore 32. On the rear face 35 of the flange 33 and around each bore 32 is a raised cylindrical boss portion 36 with a flat outer surface 37 substantially parallel to the flange-face 33. The surface 37 serves as a seat for a nut 16 on the bolt 15 which passes through each projection 31.

The lugs 13, 14 can have as many bolt-holding projections 31 as may be necessary, depending on the amount of pressure in the pipe, the type of leak, etc. The projections 31 are arranged along the lower base portion 30 of each lug 13 in a predetermined fixed-space relation so that a bolt-receiving slot 38 is defined between each adjacent flange member 33. The flat outer-edge surfaces 34 of the adjacent projection-flanges 33 on each lug are preferably beveled slightly so that in cross-section the vertical sides of each slot 38 taper inwardly toward the opposite lug, as shown in FIG. 3.

The bolts 15 preferably are of the carriage type with a head 40 and a tapered shank 41 having a square cross-section. As shown in FIG. 3, each bolt 15 fits within the bore 32 of a projecting member 31 on one lug and then extends across to the opposite lug. Each bolthead 40 seats against the rear-sides 35 of a pair of adjacent flange sections 33 on the opposite lug, while the square shank portion 41 of each bolt fits fairly loosely in the slot 38 between the adjacent projecting flange members 33. With the identically shaped lugs 13, 14 placed opposite each other, each bore 32 is aligned with a slot 38 and the bolts 15, therefore, are locked in alternate end-to-end positions along each lug, a bolthead 40 being next to a nut 16, etc. With this arrangement, the bolts can be quite close together as long as a sufficient flange 33 is provided for each bolthead 40.

In the example shown throughout the drawings, each lug 13, 14 has three bolt-holding projecting members 31, although it is apparent that, within the scope of the invention, any number of projections, and thus any number of bolts, can be employed. To provide the required number of slots 38 on one lug to match each bolt-holding projection 31 on the opposite lug, a blank end-projection 42 is provided at one end of each lug. The projection 42 is also attached integrally to the base portion and may be triangular in shape, as shown in FIG. 2. Along an inner side of projection 42 is a vertical edge-surface 43 which is in line with and has the same thickness as the flange 33 on an adjacent projection 31, thus forming therewith another bolt-receiving slot 38 on each lug. The width of the blank projection 42 is such that, as shown in FIG. 3, when the two identical lugs 13, 14 are placed facing each other with their ends on the same line, all of the bores 32 of each bolt-holding projection 31 on one lug are directly in line with the bolt-receiving slots 38 on the opposite lug.

Since the slots 38 are completely open at the top, the movement of the bolthead 40 is not restricted. Therefore, the bolts 15 can be placed through the bore-holes 32 on the lugs 13 and threaded to the nuts 16 before the clamp 10 is placed around the pipe. After this minor, initial assembly, all the workman has to do is drop the bolts 15 into the slots 38 and tighten the nuts 16. Alignment of the lugs 13, 14 is not critical, in order to connect the bolts initially. The threaded ends of the bolts 15 extend through the bolt-holding projections 31 and when the nuts 16 are attached they are tightened up to bear against either a washer or the outer face of boss portion 37 on the projection 31.

An important feature of my invention results from the alternating end-to-end arrangement of the bolts 15 on the clamp 10 which is made possible by the novel lug configuration. I discovered that, by placing the holes 32 in one lug facing the slots 38 in the opposite lug, the resultant forces are distributed over both lugs, which stabilizes each lug and prevents tilting and pressure concentration as the clamp 10 is tightened. An analysis of this force-distribution may be made by reference to FIG. 1. For example, as bolt 15a is tightened, the nut 16a pushes on the boss surface 37a and the malleable band 12 creates a tension-pulling at the lower jaw 22 of the lug 13. These forces normally would cause the lug 13 to tilt forward. Similarly, the next bolt 15b would tend to tilt the opposite lug 14 as its nut 16b was tightened. However, the tilting tendency of the lug 13 caused by the nut 16 also transmits a downward force to the bolt 15a at the point where the central bore 32a of projection 31a engages the top of the bolt 15a. This downward force on the bolt 15a is transmitted to the bolthead 40a at the rear portion of the opposite lug 14, and serves to counteract the forward tilting force exerted by the nut 16b. Thus, the tilting force exerted by each nut-and-bolt combination is counteracted by an equal force exerted by an adjoining nut 16 and bolt 15 and, assuming all nuts 16 are tightened the same amount, the lugs 13, 14 will become completely stabilized, thus assuring an equal pressure-distribution on the pipe surface. In essence, the bolts 15 are providing the stabilizing function of the relatively complicated guide fingers heretofore used, without the disadvantages of the additional structure.

Since each projection 31 extends fully across the base portion 30 of its lug, and thus presses downward on the bolts 15 along the inside surface of the projection nearest the bolthead 40, very little bending-stress in the bolt 15 occurs, and thus it is no longer a problem. Also, with the present invention, the bolts 15 at their head-end 40 are loosely held in the projection 31, initially, and as the tightening occurs and the lugs are drawn together they move upward or downward freely in their slots 38, since their heads 40 are free to slide along the flange-faces 35. This slight movement of the boltheads 40 is sufficient to effect a realignment of forces on the opposite lug, allowing it to move forward slightly as the band is tightened, until each lug seats itself with its maximum area contacting the pipe surface.

To install a clamp in which the clamping-band 12 has been secured as noted above, the band is placed around the pipe section with the lugs 13, 14 facing each other and the slots 38 of each lug aligned opposite the bolt-holding projections 31 in the opposite lug. The alignment of the lugs 13, 14 need not be perfect. The carriage-bolts 15 are placed in the bore-holes 32 in each projection 31 on both lugs, with the nuts 16 already partially threaded to the bolts. When the lugs are brought together as close as hand-pressure will effect, the boltheads 40 are dropped into their respective slots 38. With one hand holding the heads 40 in the slots, the other hand can tighten the nuts 16 to the point where a wrench is needed for further tightening.

From the above, it is apparent that the present invention provides a novel pipe clamp which provides self-stabilizing lugs, which will not tilt and gouge the pipe-surface, no matter how much tightening force is applied.

Moreover, my improved pipe clamp is extremely rugged, yet relatively simple in configuration and thus inexpensive to manufacture, since no close-tolerance holes or guide fingers are required. The lugs being completely identical are thus interchangeable. Also, the clamp can be installed easily under the most unfavorable conditions, since the alignment of the attaching bolts is not critical and the boltheads can be placed easily into their proper slots before tightening the nuts.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a pipe clamp of the type wherein the ends of a malleable band are secured around the pipe by lugs and the lugs are tightened together by locking bolts, the improvement wherein each lug is formed as one integral member having a base portion including at one side thereof means to secure one end of said band; a longitudinal series of transversely extending bolt-holding projections protruding upward from said base portion and having aligned faces at the opposite side of said base portion, each of said bolt-holding projections having a transversely disposed bore extending through said face normal thereto to receive the shaft of a locking bolt; said bolt-holding projections having offset flange members which are inwardly spaced from said faces and also being spaced from each other so as to define bolt receiving slots between said flange members, said lugs being arranged to face each other so that said bolt-holding projections on each said lug are substantially aligned with said slots on the facing lug; said bolts having flanged heads and being adapted to lie in said slots at one end when the other end of said bolts is being supported in said bolt-holding projections; and nuts on said bolts, said nuts being threadable to press against the faces of said bolt-holding projections outwardly of said flange members to draw said lugs together and tighten said band around the pipe.

2. A pipe repair clamp comprising a flexible band adapted to encircle the pipe to be repaired, a pair of lugs each secured to an end of said band, bolts attached to said lugs for drawing said lugs together to tighten said band, raised portions on each said lug, said raised portions having bolt holes for receiving the threaded end of a bolt and an outer face for engagement by a nut on said threaded end, said raised portions also having offset flange members spaced apart to form openings adjacent each said raised portion for axially retaining an adjacent bolt at its head end while allowing said head end to adjust itself vertically during tightening to reduce vertical force components thereon, said face and flange members being offset axially of said bolts and said lugs being adapted to face each other when said band is around said pipe so that each said raised portion on one lug is aligned with a said opening between said flange members on the opposite lug, whereby said bolts extend between opposing lugs with the bolt heads on adjacent bolts being retained by opposite lugs.

3. In the pipe clamp of the type wherein the end portions of a malleable band are secured by lugs with the lugs in pairs and tightened together by bolts, the combination wherein each lug has a pair of jaws between which said band end portions fit, one jaw having projections, the other jaw having recesses opposite said projections, said jaws being closed with said projections fitting into said recesses and thereby holding said end portions, raised portions on each said lug having a bore for receiving the threaded end of a bolt and an outer face for engagement by a nut on said threaded end, said raised portions being spaced apart and having opposed walls to form bolt receiving slot means, bolt head seats on said opposed walls for retaining an adjacent bolt at its head end, said face and said bolt head seats being offset axially of said bolts, said lugs being adapted to face each other when said band is around said pipe, whereby the bolt heads on adjacent bolts are retained by said slot means on opposite lugs.

4. A pipe repair clamp comprising in combination: a flexible band adapted to fit around a pipe; a pair of rigid lug members; means for securing one of said lug members to each end of said band; an even number of locking bolts held by said lugs and arranged in alternately opposed directions between said lug members and having nuts threaded thereon to draw the ends of said flexible band together; each said lug member having a base portion adapted to lie on said band adjacent said pipe, a series of bolt-holding projections and one blank-end projection extending upward from and across the width of said base portion of each said lug, each said bolt-holding projection having a bore to receive the threaded end of a locking bolt and an outer face for engagement by a nut on said threaded end, flange members on opposite sides of said bolt-holding projections with sides extending generally perpendicular to the bore axes of said projections, and spaced apart so as to define slots between said flange members, said faces and said flange members being offset axially of said bolts and said lugs being adapted to face each other so that said bolt-holding projections on both lugs are substantially aligned with said slots between flange members on said opposite lug; whereby each said bolt is adapted to lie in a said slot in one said lug while the other end of said bolt is supported in an aligned bolt-holding projection of the other lug.

5. A pipe repair clamp comprising in combination: a flexible band adapted to fit around a pipe; a pair of rigid lug members; means for securing one of said lug members to each end of said band; a plurality of locking bolts having threaded ends held by said lugs and arranged in alternately opposed directions between said lug members, nuts on said threaded ends of said bolts to draw the ends of said flexible band together; each said lug member having a base portion, and a series of bolt-holding projections extending upward from and across said base portion of each said lug, each said bolt-holding projection having a bore to receive the threaded end of a locking bolt and an outer face for engagement by a nut on said threaded end, said bolt-holding projections having walls spaced apart so as to form slots between said projections, bolt head seats on said spaced walls for retaining the head ends of the locking bolts in said slots, said faces and said seats being offset axially of said bolts and said lugs being adapted to face each other so that said bolt-holding projections on both lugs are substantially aligned with said slots in the opposite lug; whereby each said bolt is supported in a bolt-holding projection in one lug and is adapted to lie in an aligned slot on the other lug, and when said bolts are tightened to bring said lugs together, the force tending to tilt each lug will be counteracted by the engagement of the head end of each bolt in the slot on the opposite lug.

6. The device described in claim 5 wherein the slots on each lug are aligned along the rear outside-face of the lug to provide the maximum counteracting tilting force from the opposite lug.

References Cited in the file of this patent

UNITED STATES PATENTS

| | | |
|---|---|---|
| 1,907,889 | Stauffer | May 9, 1933 |
| 2,227,551 | Morris | Jan. 7, 1941 |
| 2,377,510 | Newell | June 5, 1945 |
| 2,826,799 | Schustack | Mar. 18, 1958 |
| 2,853,762 | Smith | Sept. 30, 1958 |